(12) United States Patent
Paris et al.

(10) Patent No.: US 9,111,099 B2
(45) Date of Patent: Aug. 18, 2015

(54) CENTRALIZED KERNEL MODULE LOADING

(75) Inventors: Eric Paris, Raleigh, NC (US); Neil Horman, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 243 days.

(21) Appl. No.: 13/149,808

(22) Filed: May 31, 2011

(65) Prior Publication Data

US 2012/0311341 A1 Dec. 6, 2012

(51) Int. Cl.
*G06F 21/10* (2013.01)
*G06F 21/57* (2013.01)
*G06F 21/60* (2013.01)
*H04L 9/32* (2006.01)

(52) U.S. Cl.
CPC .............. *G06F 21/57* (2013.01); *H04L 9/3236* (2013.01)

(58) Field of Classification Search
CPC ....... G06F 21/10; G06F 21/60; G06F 21/602; G06F 21/6218; G06F 2221/2149; G06F 21/121; G06F 21/44; G06F 12/1408; G06F 2009/45587; G06F 21/53; G06F 21/565; G06F 21/6227; G06F 21/64; H04L 9/3247
USPC ............ 713/176, 182, 187, 189; 726/2, 4, 22, 726/26, 27, 30
See application file for complete search history.

(56) References Cited

U.S. PATENT DOCUMENTS

| 7,058,950 | B2* | 6/2006 | Jeyaraman | 718/104 |
| 7,103,779 | B2* | 9/2006 | Kiehtreiber et al. | 713/187 |
| 7,231,518 | B1* | 6/2007 | Bakke | 713/168 |
| 2007/0094390 | A1* | 4/2007 | Nussey | 709/225 |
| 2007/0226320 | A1* | 9/2007 | Hager et al. | 709/219 |
| 2009/0282474 | A1* | 11/2009 | Chen et al. | 726/21 |
| 2010/0058317 | A1* | 3/2010 | Braams | 717/171 |
| 2010/0229173 | A1* | 9/2010 | Subrahmanyam et al. | 718/103 |
| 2011/0040960 | A1* | 2/2011 | Deierling et al. | 713/2 |
| 2011/0145598 | A1* | 6/2011 | Smith et al. | 713/190 |
| 2012/0096274 | A1* | 4/2012 | Campagna et al. | 713/176 |
| 2012/0249304 | A1* | 10/2012 | Liu et al. | 340/10.1 |
| 2012/0303963 | A1* | 11/2012 | Murao et al. | 713/178 |

* cited by examiner

*Primary Examiner* — Michael Chao
*Assistant Examiner* — Shiuh-Huei Ku
(74) *Attorney, Agent, or Firm* — Lowenstein Sandler LLP

(57) ABSTRACT

Methods and systems for centralized kernel module loading are described. In one embodiment, a computing system detects a kernel module load event to load a kernel module into a kernel of a client. Upon detection of the kernel module load event, the computing system computes a cryptographic hash of the kernel module, and sends the cryptographic hash to an access control server to verify whether the cryptographic hash is a permitted hash. The computing system receives a response from the access control server to permit or deny the kernel module load event, and permits or denies the kernel module load event based on the response.

25 Claims, 8 Drawing Sheets

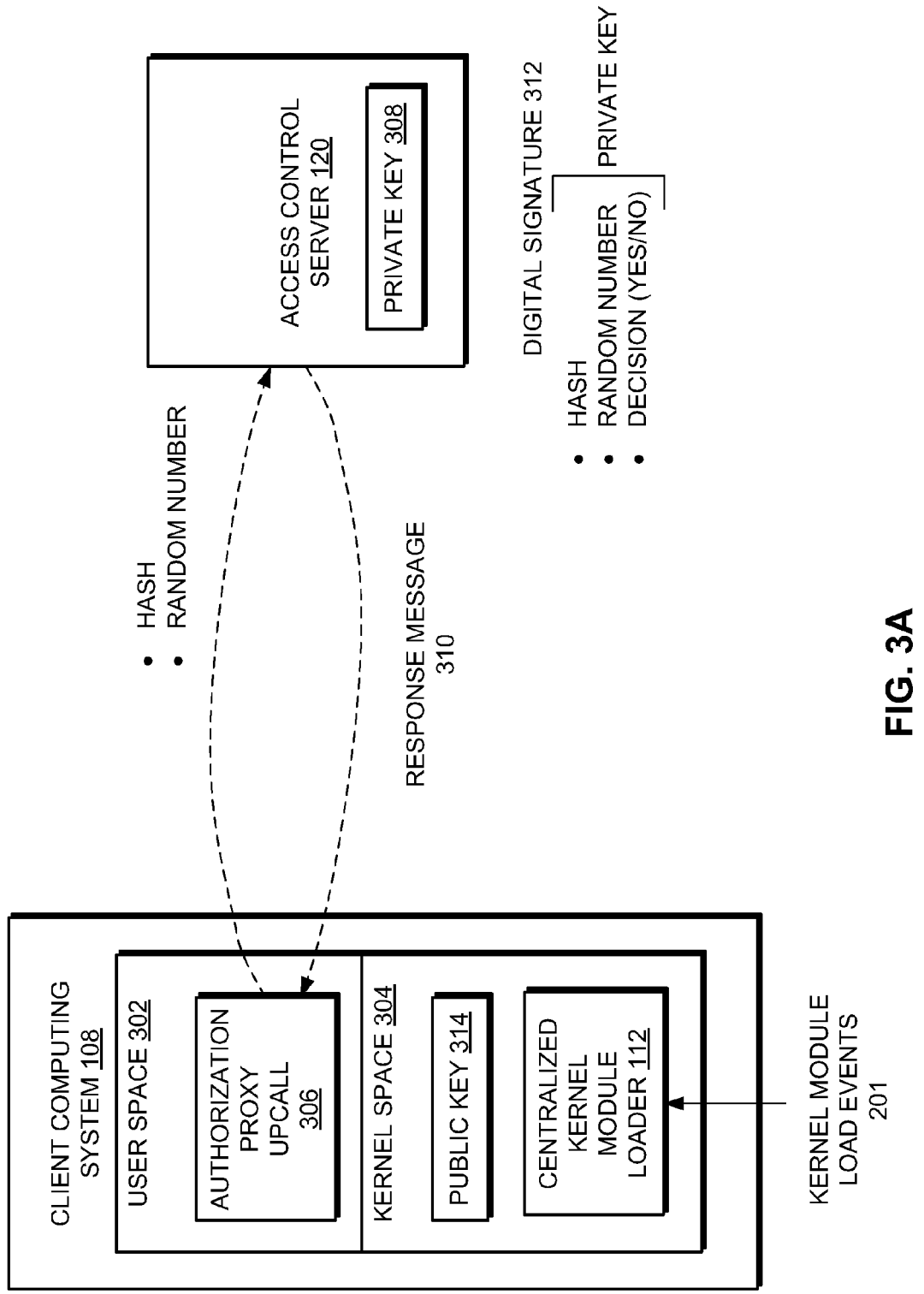

CENTRALIZED KERNEL MODULE LOADING

TECHNICAL FIELD

Embodiments of the present invention relate to kernel module loading, and more specifically, to centralized kernel module loading.

BACKGROUND

There is a growing trend of providing computing resources in a hosted computing environment, also called cloud computing. These hosted computing environments typically include one or more cloud-based servers that host computing resources for one or more guests to use. These cloud-based servers may host multiple virtual machines that are owned or managed by different entities (e.g., organizations or enterprises). Although owned or serviced by different entities, these virtual machines may share their presence on a common physical computer in the hosted computing environment. Typically, administrators of the virtual machines are given full administrative access (also referred to as root access) to their respective guests systems. The administrative access permits the administrator to load kernel modules into the kernel, such as a module containing a network card driver to allow for network access via that card. However, the full administrative access to one virtual machine may give an administrator the ability to load kernel modules that may affect the other virtual machines on the common physical computer. For example, by giving administrative access to administrators of different entities, the hosted computing resources become more susceptible to attacks by a guest on top of a hypervisor (also referred to as a virtual machine monitor (VMM)). The operators of the cloud computing would like to exercise a modicum of control over how much access a given guest might have to privileged execution on that guest, so as to minimize the attack surface the guest might have upon the hypervisor/VMM, while still allowing full administrative access (root access) to the guest system. In some operating systems (e.g., Linux operating systems), this translates to disallowing the loading of kernel modules, which execute in a privileged context. By limiting the privileged code to only that of a well known kernel, the operator of the hosted computing system can limit the attack surface between the guest and the VMM to only that of the well known and well tested interfaces intended to be used by the kernel. However, without the ability to load some modules, a system cannot function. For example, a module containing the network card driver must be loaded to allow for network access via that card.

Also, in the context of physical computing systems, some operating systems may limit what kernel modules can be loaded using digital signatures. If a kernel module is not digitally signed by a trusted authority, the operating system will not permit the kernel module to be loaded and executed.

These conventional approaches are limited in providing sufficient administrative access to system administrators, while providing control over which kernel modules can be loaded into a kernel of the operating system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3A is a diagram illustrating another embodiment of the centralized kernel module loader.

DETAILED DESCRIPTION

Figure 1:
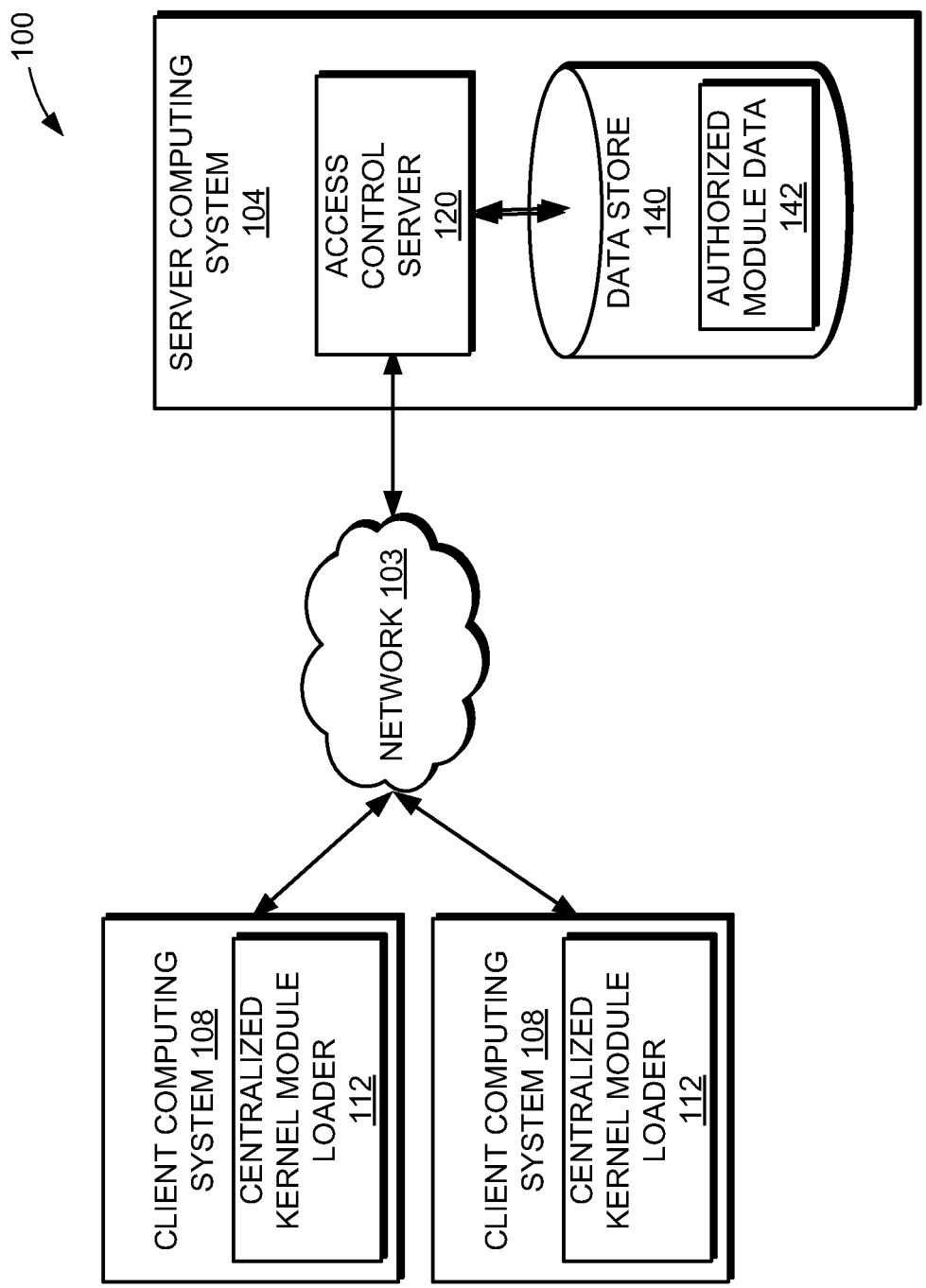
FIG. 1 is a block diagram of an exemplary network architecture in which embodiments of a centralized kernel module loader may operate.

Methods and systems for centralized kernel module loading are described. In one embodiment, a computing system detects a kernel module load event to load a kernel module into a kernel of a client. Upon detection of the kernel module load event, the computing system computes a cryptographic hash of the kernel module, and sends the cryptographic hash to an access control server to verify whether the cryptographic hash is a permitted hash. The computing system receives a response from the access control server to permit or deny the kernel module load event, and permits or denies the kernel module load event based on the response. In one embodiment, the computing system executes a centralized kernel module loader that is configured to detect the load event, compute the cryptographic hash of the kernel module being loaded, and send the cryptographic hash to the access control server. The centralized kernel module loader may communicate with the access control server using a user space application. The client may be a physical computing system, a virtual computing system, or a combination of both.

Embodiments of the present invention provide an improved system that allows centralized management of what kernel modules can be loaded into kernels of computing systems. Unlike conventional solutions that either limit the privileged code to only that of a well known kernel or provide digital signing of kernel modules, the embodiments described herein can prevent a system administrator, who has access privileges to load kernel modules, from loading kernel modules that have not been approved by an entity, such as a hosted computing service provider (e.g., a cloud-computing system administrator). The embodiments described herein provide centralized management of what kernel modules can be loaded onto both virtual clients, as well as physical clients. For example, the embodiments described herein can be used to control which kernel modules can be loaded on virtual machines hosted on computing systems within an entity, such as an organization or enterprise, while still allowing system administrators of those systems to have administrative access to those computing systems. Similarly, the embodiments described herein can be used to control which kernel modules can be loaded onto physical machines.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a centralized kernel module loader 112 for centralized kernel module loading access control may operate. The network architecture 100 may include a server computing system 104 and multiple client computing systems 108, each connected via a network 103, which may be a private network (e.g., a local area network (LAN), wide area network (WAN), intranet, etc.) or a public network (e.g., the Internet). The client computing system 108 may be one or more machines, including a desktop computer, laptop computer, server, cellular phone, personal digital assistant (PDA), etc. In one embodiment, the client computing system 108 is a server of an enterprise, but is a "client" with respect to the server computing system 104. The client computing system 108 interacts with the server computing system 104 by exchanging messages via standard protocols, e.g., FTP and HTTP. The client computing system 108 executes the centralized kernel module loader 112. The centralized kernel module loader 112 may be a kernel module in a kernel of an operating system of the client computing system 108. The centralized kernel module loader 112 may also include other helper processes that are executed in the kernel, the user space, or both. The client machine 102 may also include a command line interface (CLI) or a graphical user interface (GUI) for allowing a user, such as a system administrator, to request the loading of kernel modules into the kernel. The centralized kernel module loader 112 approves or denies the request by communicating with an access control server 120 as described herein. The operations of the centralized kernel module loader 112 are described in more detail below with respect to FIGS. 2-4B.

The server computing system 104 may be one or more machines including one or more server computers, gateways, or other computing systems. The server computing system 104 hosts the access control server 120 and may include a data store 140 that stores authorized module data 142. The access control server 120 may be a process run on the server computing system 104 to monitor incoming kernel module loading requests from the centralized kernel module loaders 112 of the client computing systems 108. In the depicted embodiment, the access control server 120 is depicted as software executed on the server computing system 104. In another embodiment, the access control server 120 may be a dedicated machine, or may one of various processes being performed by the server computing system. The operations of the access control server 120 are described in more detail below with respect to FIGS. 2-4B.

The server computing system 104 may also include a local data store 140, which can be one or more centralized data repositories that store the authorized module data 142, such as a list of authorized kernel modules, a list of denied kernel modules, or the like. Alternatively, or in addition to these types of lists, the authorized module data 142 may include pre-approved kernel modules that can be loaded by the client computing system 108 and their corresponding hashes. When the access control server 120 determines that the client computing system 108 is attempting to load a modified version of the kernel module, the access control server 120 can send the corresponding pre-approved kernel module in its response to the client computing system 108 to be loaded instead of the requested kernel module. The authorization module data 142 may include additional data corresponding to the kernel modules that are permitted to be loaded into the kernels of the client computing system 108. The local data store 140 may represent a single or multiple data structures (databases, repositories, files, etc.) residing on one or more mass storage devices, such as magnetic or optical storage based disks, tapes or hard drives. Although illustrated as being local to the server computing system 104, the local data store 140 may be remote from the server computing system 104 and the server computing system 104 can communicate with the remote data store over a public or private network, a bus, or the like.

Figure 2:
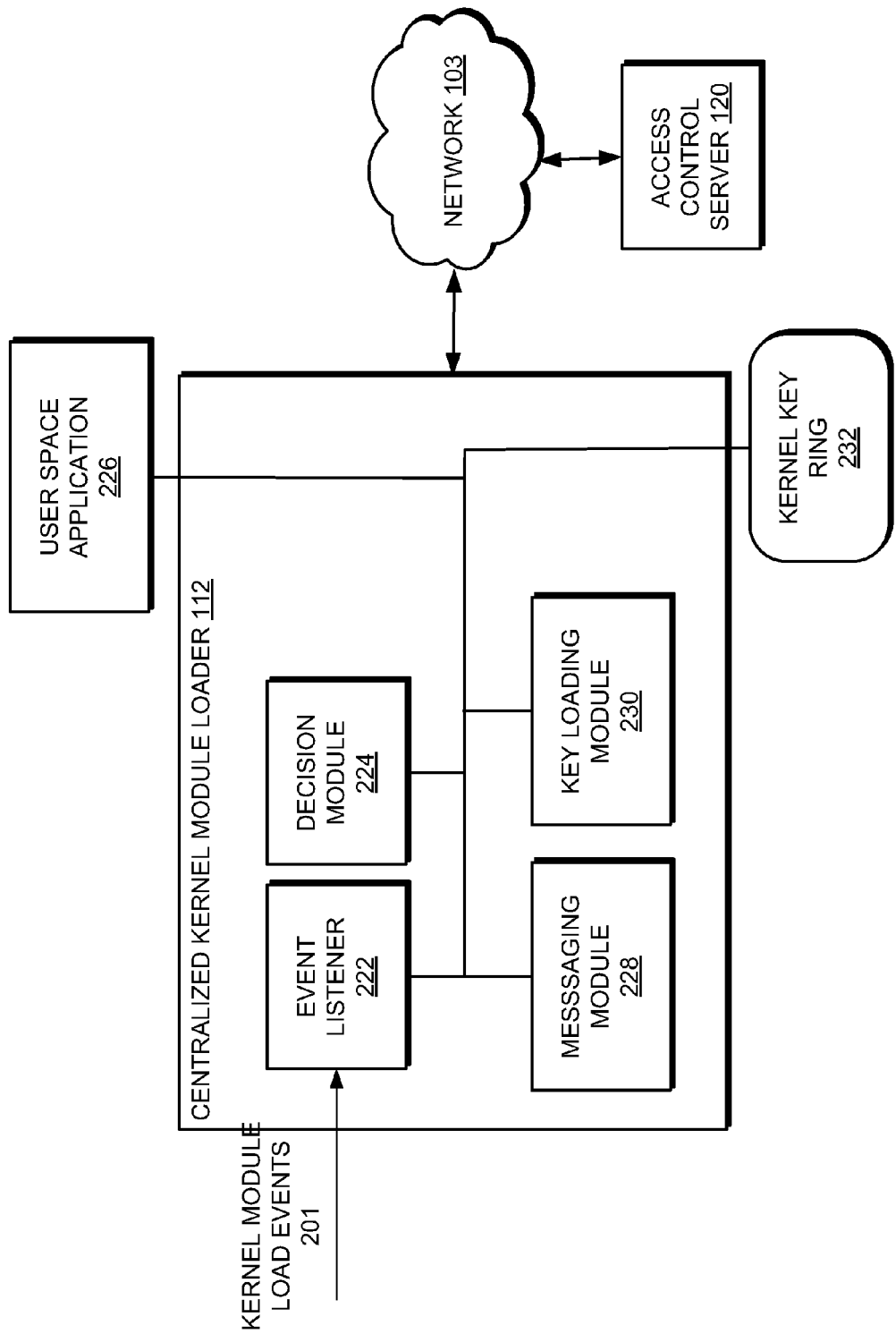
FIG. 2 is a block diagram of the centralized kernel module loader of FIG. 1 according to one embodiment.

FIG. 2 is a block diagram of the centralized kernel module loader 112 of FIG. 1 according to one embodiment. In the depicted embodiment, the centralized kernel module loader 112 includes an event listener 222, a decision module 224, a messaging module 228, and a key loading module 230. The centralized kernel module loader 112 may be a mechanism in the kernel which allows for the registration of listeners (e.g., event listener 222) for kernel module load events 201. The centralized kernel module loader 112 includes a decision module 224 that is configured to make access control decisions for the given load event. The event listener 222, which may be a kernel module itself, registers as a listener in the kernel module loader 112, which upon receipt of a kernel module load event 201 to load a kernel module into the kernel, computes a cryptographic hash of the requested kernel module. Alternatively, the decision module 224 may compute the cryptographic hash. In one embodiment, the kernel module loader 112 generates a random number (e.g., a nonce), which is used to prevent replay attacks, and sends the random number along with the computed cryptographic hash to the access control server 120.

In one embodiment, the event listener 222 (or the decision module 224) executes the user space application 226, which may be an untrusted user space helper process, which sends the cryptographic hash of the requested kernel module to the access control server 120, such as over the network 103. For example, the event listener 222 can make an upcall to the user application 226 to send the cryptographic hash to the access control server 120. The access control server 120 checks if the kernel module's hash is in a list of approved hashes, such as a list of explicitly permitted or denied hashes stored in the data store 140. The access control server 120 includes a mechanism by which the access control server 120 responds to the user space application 226. In one embodiment, the response is a message that includes the original hash of the requested kernel module, a decision (e.g., yes or no, approve or deny, or the like), and a cryptographic signature of the hash and decision. The access control server 120 generates the cryptographic signature using a private key known only to the access control server 120.

The user space application 226 receives the message sent back by the access control server 120 and sends the message to a messaging module 228 of the centralized kernel module loader 112. The messaging module 228 checks the validity of the message received from the user application 226 using a public key. A key loading module 230 is configured to load the public key into a kernel key ring 232 for later use. The messaging module 228 can use the public key that is loaded in the kernel key ring 232 for checking the validity of the message. In one embodiment, the key loading module 230 uses a trusted initial ramdisk (initrd) operation to load the public key into the kernel. The "initrd" is a temporary file system used in the boot process of the kernel, and can be used to make preparations before the root file system can be mounted. In another embodiment, the public key could be compiled directly into the kernel. Alternatively, other mechanisms may be used for reliable and trusted loading of the public key into the kernel, such as into the kernel key ring 232.

After the message has been validated, the decision module 224 matches the validated message against the outstanding kernel module load event 201. In one embodiment, the validated message is matched against load event 201 by comparing the computed cryptographic hash by the event listener 222 (or by the decision module 224 as described above) with the cryptographic hash received in the message via the messaging module 228. Alternatively, the messaging module 228 can match the validated message against the outstanding kernel module load event 201, instead of the decision module 224. When the validated message has been matched, the decision module 224 enforces the decision received in the message. For example, the decision module 224 may allow the kernel module load event 201 to load, for example, by allowing the linking of the content (e.g., code) of the kernel module and executing the kernel module. When the decision is to deny the kernel module load event 201, the decision module 224 may remove the kernel module from memory, may notify a user of the denial of the kernel module load event 201, notify a system administrator, notify a cloud-computing system administrator, or any combination thereof.

FIG. 3A is a diagram illustrating another embodiment of the centralized kernel module loader 112. In the depicted embodiment, the client computing system 108 includes a user space 302 and a kernel space 304. In this embodiment, the centralized kernel module loader 112 is a kernel module in the kernel space 304. The centralized kernel module 112 is configured to communicate with the access control server 120. In this embodiment, the centralized kernel module loader 112 makes an authorization proxy upcall 306, which communicates the cryptographic hash of the kernel module corresponding to the kernel module load event 201 detected by the centralized kernel module loader 112 to the access control server 120. The access control server 120 receives the cryptographic hash and the random number generated by the centralized kernel module loader 112, and determines if the cryptographic hash is an authorized cryptographic hash that can be loaded into the kernel space 304. The access control server 120 then generates a response message 310. For the response message 310, the access control server 120 uses a private key 308 to generate a digital signature 312. In one embodiment, the access control server 120 generate a digital signature 312 of the original hash received by the client computing system 108, the random number, and a decision (e.g., yes or no, allow or deny, or the like) to permit or deny the kernel module load event 201. Alternatively, the digital signature 312 may include more or less information, and may include different information than those described above. In this embodiment, the response message 310 includes the digital signature 312, the original hash received by the client computing system 108, and the decision. Alternatively, the access control server 120 may send more or less information in the response message 310. For example, the decision may not include the result, and the centralized kernel module loader 112 could compute the hash of both a failure and a success and see which (if either) was correct.

The authorization proxy upcall 306 receives the response message 310 from the access control server 120 and sends the response message to the centralized kernel module loader 112 to process the response message accordingly. In the depicted embodiment, the centralized kernel module loader 112 validates the response message 310 by decrypting the digital signature 312 in the response message 310. Upon validation, the centralized kernel module loader 112 enforces the decision received in the response message 310 from the access control server 120. Since the access control server 120 uses a digital signature using asymmetric cryptography (e.g., public and private key pairs), the client computing system 108 can verify that the response message 310 has not been tampered with or has not been subject to a man-in-the-middle attack. In another embodiment, the client computing system 108 and access control server 120 may communicate using other schemes as would be appreciated by one of ordinary skill in the art having the benefit of this disclosure, such as symmetric key cryptography.

In another embodiment, the access control server 120 is configured to determine that the requested kernel module is a modified or a different version of an approved kernel module. In this embodiment, the access control server 120 sends the approved kernel module in the response message 310 to be loaded by the centralized kernel module loader 112 instead of the original kernel module. The access control server 120 may maintain the list of approved kernel modules, as well as the contents of the kernel modules themselves. The access control server 120 may also store contents of pre-approved kernel modules that can be sent in the responses to the client computing systems 108. The access control server 120 may use the cryptographic hashes of the approved kernel modules to determine correlations between the approved kernel modules and the different versions or modified versions of the kernel module. Alternatively, other techniques may be used to detect that the requested kernel module is a modified version of one of the pre-approved or otherwise-approved kernel modules as would be appreciated by one of ordinary skill in the art having the benefit of this disclosure.

Figure 3B:
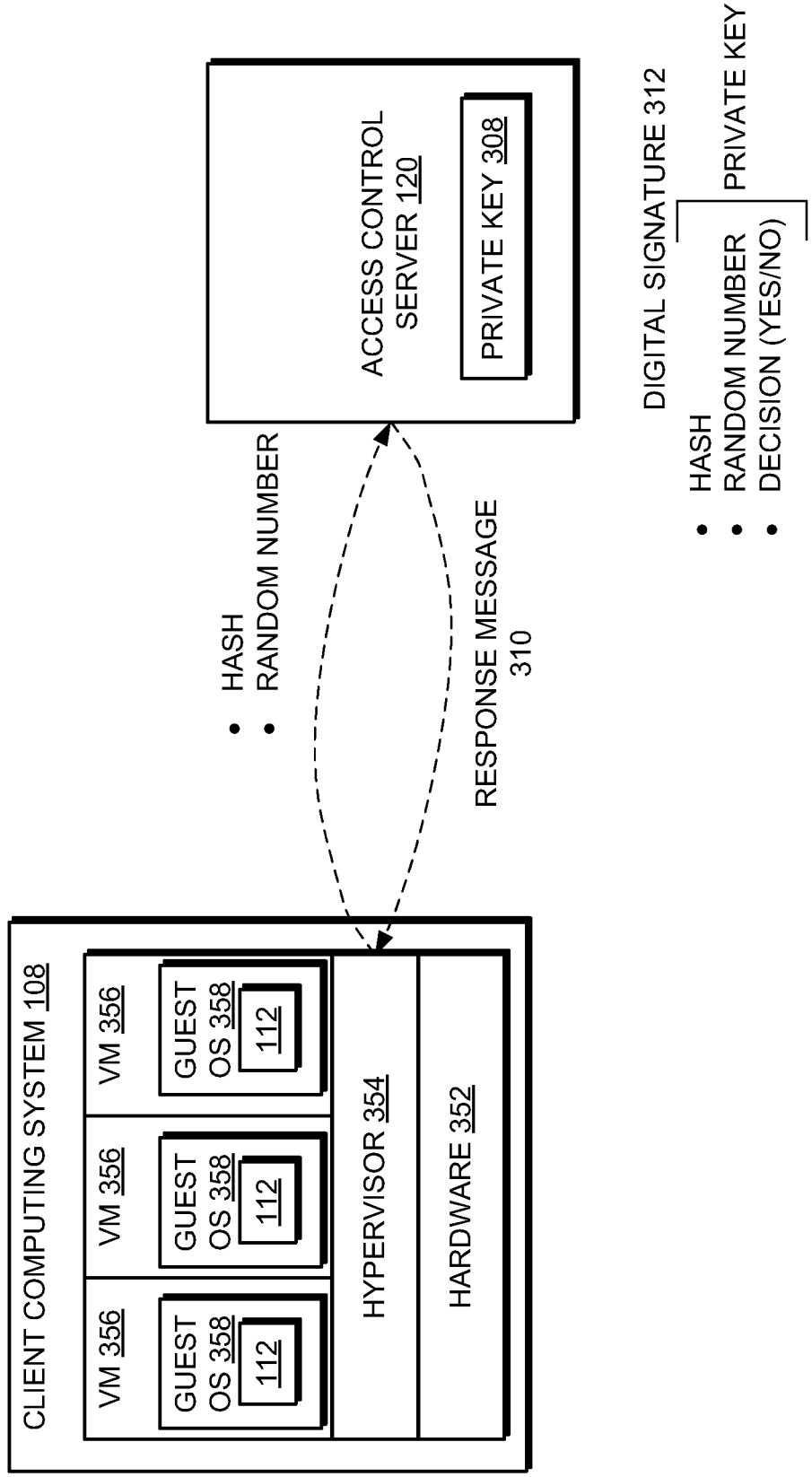
FIG. 3B is a diagram illustrating another embodiment of the centralized kernel module loaders in guest operating systems of multiple virtual machines of a computing system.

FIG. 3B is a diagram illustrating another embodiment of the centralized kernel module loaders 112 in guest operating systems of multiple virtual machines 356 of a computing system 108. As described above, a hosted computing environment typically includes one or more cloud-based servers that host computing resources for one or more guests to use. A hypervisor 354, also called a virtual machine monitor (VMM) is a hardware virtualization technique that allows multiple operating systems, termed guests or guest operating systems 358, to run concurrently on hardware 352 of a host computer (e.g., the client computing system 108). The hypervisor 354 presents to the guest operating systems 358 a virtual operating platform and manages the execution of the guest operating systems 358. In the depicted embodiment, the client computing system 108 host multiple virtual machines 356. These virtual machines 356 may be owned or managed by different entities (e.g., organizations or enterprises). Although owned or serviced by different entities, these virtual machines 356 share their presence on a common physical computer in the hosted computing environment, i.e., the client computing system 108. It should be noted that client computing system 108 is a server that hosts the virtual machines 356, but is a client with respect to the access control server 120.

As described above, administrators of the virtual machines 356 are given full administrative access (also referred to as root access) to their respective guest operating systems 358. The administrative access permits the administrator to load kernel modules into the kernel. Conventionally, full administrative access to one virtual machine would give an administrator the ability to load kernel modules that may allow the guest machine additional attack vectors against the hypervisor and thus may allow the virtual machine to disrupt the operation of the other virtual machines. It should be noted that there is nothing inherently dangerous about loading a kernel module in a virtual machine, but if a hypervisor is broken, a malicious module could be loaded to exploit the brokenness of the hypervisor. Using the centralized kernel module loader 112 and the access control server 120, the operators of the hosted computing environment can control how much access a given guest might have to privileged execution on that guest operating system 358. This minimizes the attack surface the guest might have upon the hypervisor 354, while still allowing full administrative access (root access) to the guest operating system 358. In one embodiment, the hypervisor 354 is a client which implements a centralized kernel module loader 112 (not shown). In another embodiment, each of the virtual machines 358 is a client which implements a centralized kernel module loader 112.

In one embodiment, during operation, the centralized kernel module loader 112 detects kernel module load events and communicates with the hypervisor 354 to request permission to load the kernel module into the kernel of the guest operating system 358 (e.g., hypercall). The hypervisor 352 communicates with the access control server 120, sending the kernel module load event requests to the access control server 120, and receiving the response messages 310 from the access control server 120. In another embodiment, the centralized kernel module loader 112 uses network-based methods to communicate with the access control server 120, as described herein with respect to physical machines. In some embodiments, the centralized kernel module loader 112 communicates with an application in the user space (e.g., upcall), which communicates with the access control server 120 using network based communications. The operations of centralized kernel module loading are described in more detail below with respect to FIG. 4C.

Figure 4A:
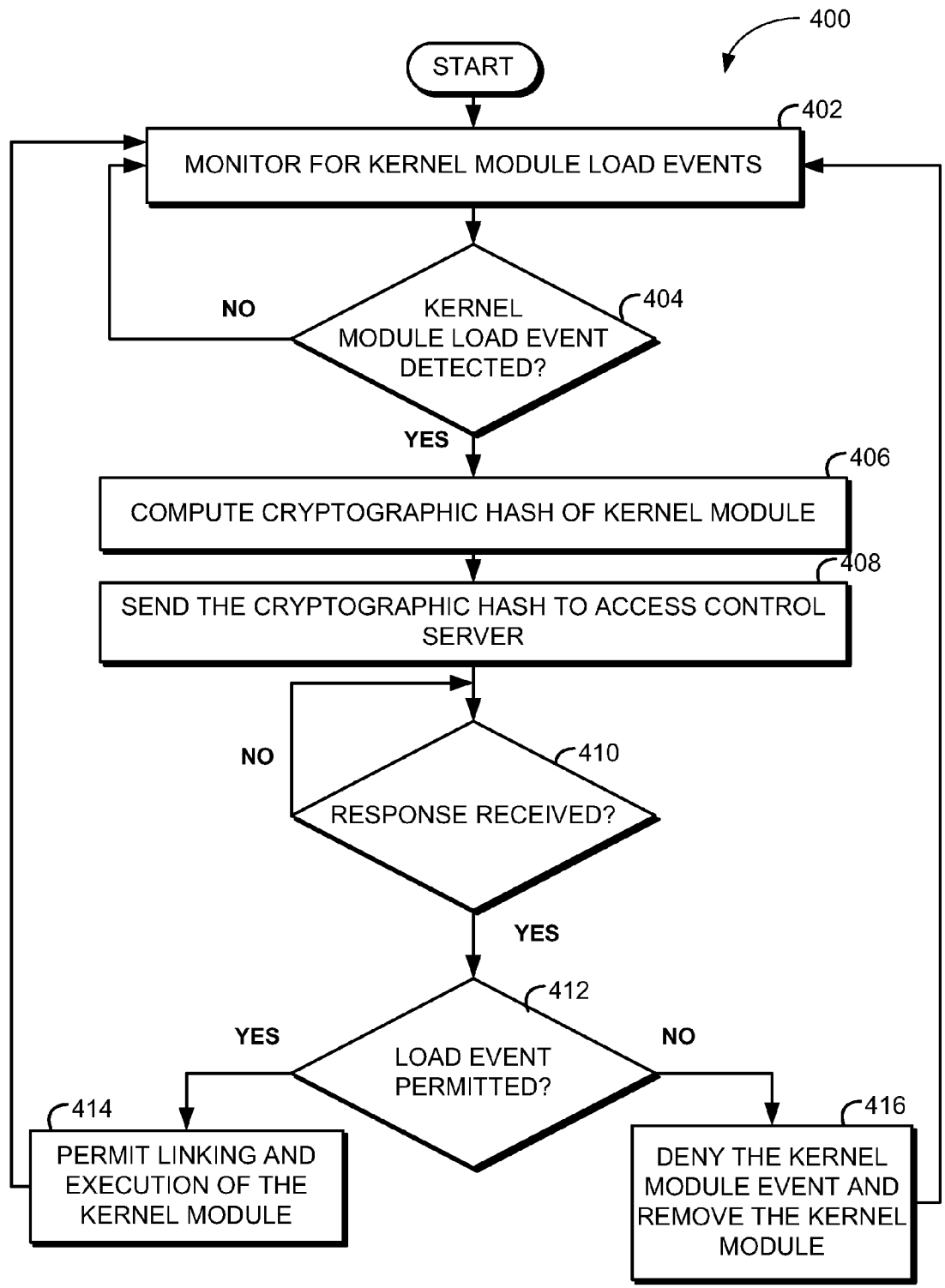
FIG. 4A is a flow diagram of one embodiment of a client-side method of centralized kernel module loading access control.

FIG. 4A is a flow diagram of one embodiment of a client-side method 400 of centralized kernel module loading access control. The method 400 is performed by processing logic that may comprise hardware (circuitry, dedicated logic, etc.), software (such as is run on a general purpose computing system or a dedicated machine), firmware (embedded software), or any combination thereof. In one embodiment, the centralized kernel module loader 112 of FIGS. 1-3 performs the method 400. Alternatively, other components of the client computing system 108, server computing system 104, or both can perform some or all of the operations of method 400.

Referring to FIG. 4A, processing logic begins with monitoring for kernel module load events (block 402). The processing logic determines if a kernel module load event is detected (block 404). When no event is detected, the processing logic returns to block 402 to continue monitoring for the events. If at block 404 the processing logic detects the kernel module load event, the processing logic computes the cryptographic hash of the kernel module requested to be loaded (block 406), and sends the cryptographic hash to an access control server for approval (block 408). As described in detail with respect to FIG. 4B, the access control server verifies that the cryptographic hash is a permitted hash, such as by checking if the cryptographic hash is in a list of explicitly permitted or denied hashes. At block 410, the processing logic determines if a response is received from the access control server that indicates the access control server's decision on the load event. If not, the processing logic continues to wait for a response from the access control server. When the processing logic receives a response at block 410, the processing logic determines whether to permit the load event based on the response from the access control server (block 412). If the load event is permitted at block 412, the processing logic permits the linking and execution of the kernel module in the kernel (block 414). However, if the load event is not permitted at block 412, the processing logic denies the kernel module load event and removes the kernel module from memory (block 416).

In another embodiment of the method, the processing logic detects a kernel module load event to load a kernel module into a kernel of a client, and computes a cryptographic hash of the kernel module. The processing logic sends the hash to the access control server to verify whether the hash is a permitted hash for loading into the kernel of the client. The processing logic receives a response from the access control server to permit or deny the load event, and enforces the access control server's decision to permit or deny the kernel module load event based on the response.

In one embodiment at block 402, the processing logic registers a second kernel module as an event listener for the kernel module load events, and the event listener monitors for the kernel module load events. This event listener may also compute the cryptographic hash. The processing logic may also execute a user space application in a user space of the client, and the user space application sends the cryptographic hash to the access control server, such as over a network connection or over other types of connections between the client and the access control server as would be appreciated by one of ordinary skill in the art having the benefit of this disclosure. In one embodiment, the user space application is an untrusted user space helper process that is used by the centralized kernel module loader as described herein. In another embodiment, the user space application is a trusted application.

In another embodiment at block 410, the processing logic receives a message from the access control server, including the cryptographic hash, a decision to permit or deny the kernel module load event on the client, and a cryptographic signature of the cryptographic hash and the decision. In one embodiment, the access control server generates the cryptographic signature using a private key of the access control server. In this embodiment, the processing logic at block 412 can check the message for validity using a public key loaded into the kernel, as described herein when determining whether to permit or deny the load event. In another embodiment, the processing logic matches the received message with the outstanding kernel module load event. The processing logic, for example, may compare the computed cryptographic hash against the cryptographic hash received in the message.

In one embodiment of the method at block 406, the processing logic computes the cryptographic hash by copying contents of the kernel module into memory of the client, calculates the cryptographic hash of the contents, and stores the cryptographic hash in the memory. When the kernel module load event is permitted at block 412, the processing logic links the contents of the kernel module and executes the kernel module at block 414. When the kernel module load event is not permitted at block 412, the processing logic removes the contents (and the cryptographic hash) from the memory at block 416.

In one embodiment of the method at block 408, the processing logic sends the cryptographic hash to the access control server via a network over a network connection. In another embodiment, the processing logic sends the cryptographic hash over a serial port connection. In another embodiment, the processing logic sends the cryptographic hash via hypervisor (also referred to as a virtual machine monitor). For example, in one embodiment, the client is a virtual machine executed by the client computing system, and the processing logic of the virtual machine sends the cryptographic hash via a hypervisor upcall. The hypervisor communicates with the access control server, and receives the response, sending the response back to the processing logic of the virtual machine to permit or deny the kernel module load event. In another embodiment, the client is the client computing system itself. Alternatively, the processing logic may communicate with the access control server using other methods as would be appreciated by one of ordinary skill in the art having the benefit of this disclosure.

Figure 4B:
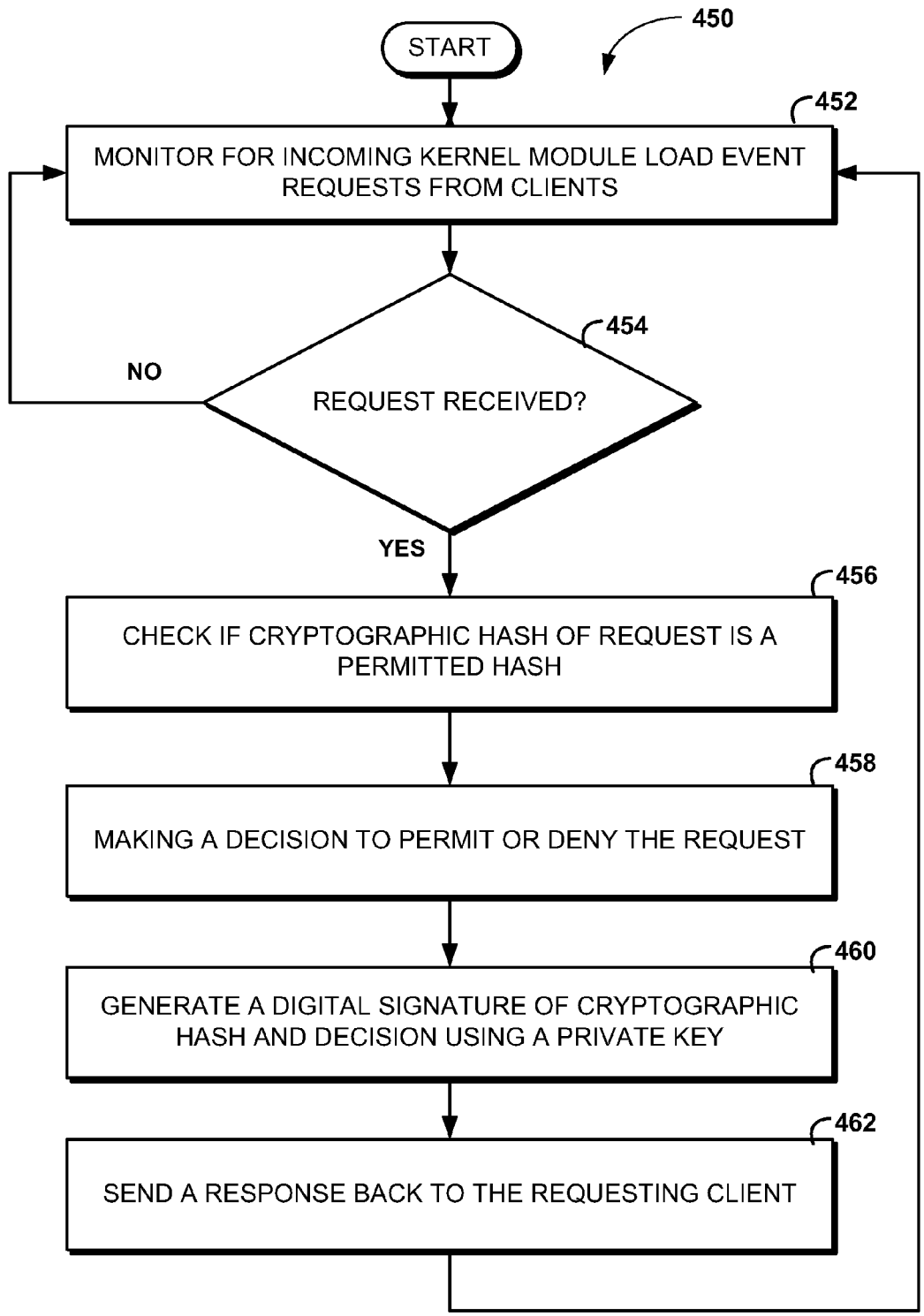
FIG. 4B is a flow diagram of one embodiment of a server-side method of centralized kernel module loading access control.

FIG. 4B is a flow diagram of one embodiment of a server-side method 450 of centralized kernel module loading access control. The method 450 is performed by processing logic that may comprise hardware (circuitry, dedicated logic, etc.), software (such as is run on a general purpose computing system or a dedicated machine), firmware (embedded software), or any combination thereof. In one embodiment, the access control server 120 of FIGS. 1-3 performs the method 450. Alternatively, other components of the client computing system 108, server computing system 104, or both can perform some or all of the operations of method 450.

Referring to FIG. 4B, processing logic begins with monitoring for incoming kernel module load event requests from clients (block 452). At block 454, the processing logic determines if a request is received. If not, the processing logic continues monitoring at block 452. If at block 454 a request is received, the processing logic checks if the cryptographic hash of the request is a permitted hash (block 456), and the processing logic makes a decision to permit or deny the request (block 458). The processing logic generates a digital signature of the cryptographic hash and the decision using a private key (block 460), and sends a response back to the requesting client. The response includes the digital signature, including the decision.

In another embodiment at block 456, the processing logic checks to see if the cryptographic hash is in a list of explicitly permitted or denied hashes. The processing logic makes the decision to permit or deny at block 458 based on whether the hash is in the list or not. In another embodiment, the processing logic generates the digital signature using other information to help the client verify the access control server's response (e.g., message including the decision to permit or deny the kernel module load event). In one embodiment, the processing logic sends the response back to the user application executed by the client computing system, and the user application communicates the response to the centralized kernel loader as described herein. This may be over a network connection, a serial port connection, or the like. The processing logic may also send the response back to a hypervisor that sent the request. Alternatively, the processing logic may perform more or less operations to permit or deny, and communicates the response back to the requesting client as would be appreciated by one of ordinary skill in the art having the benefit of this disclosure.

Figure 4C:
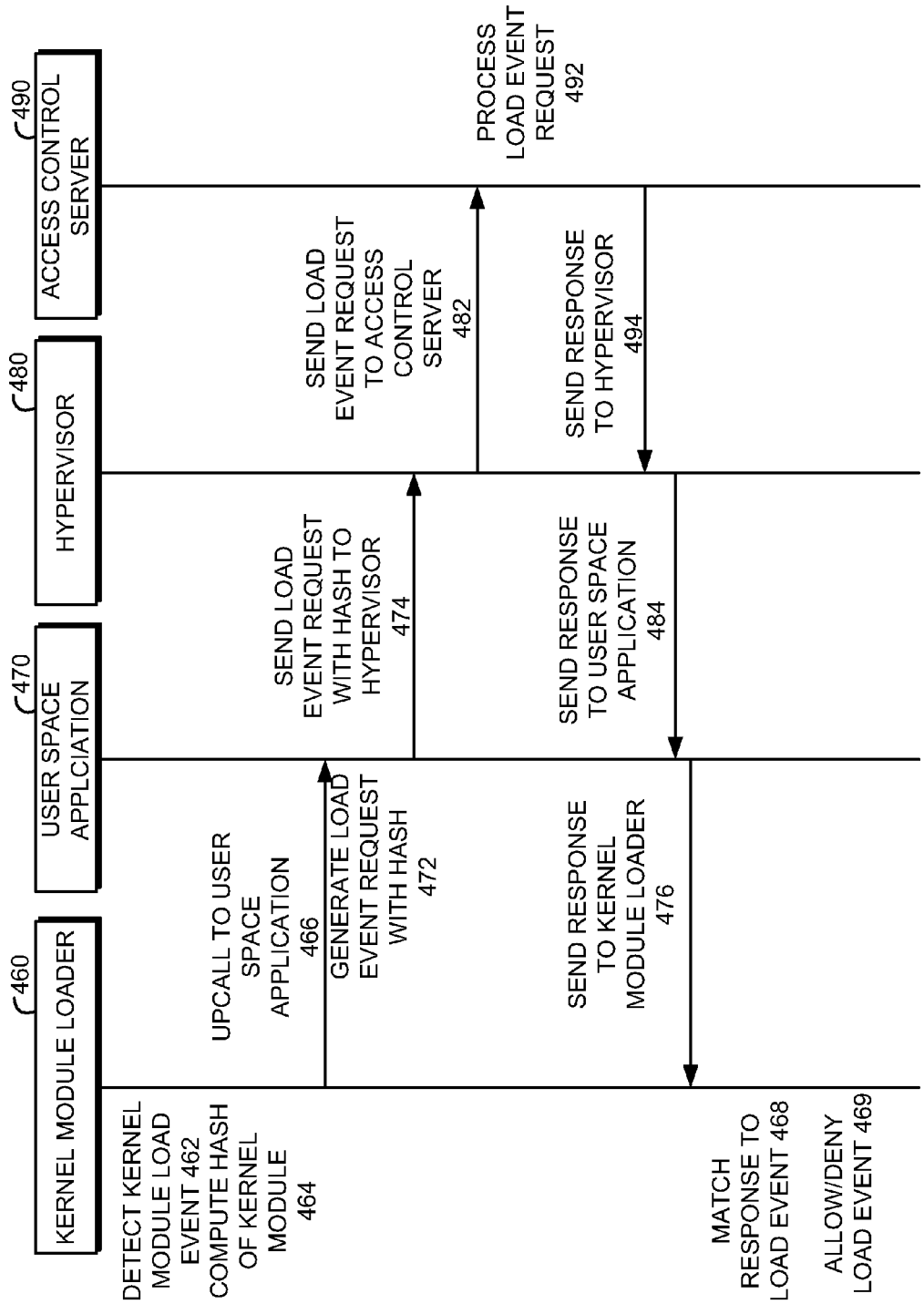
FIG. 4C is a flow diagram of one embodiment of the centralized module loader in a guest operating system of a virtual machine.

FIG. 4C illustrates one embodiment of operations of the centralized kernel module loader in a guest operating system of a virtual machine. In this embodiment, the centralized kernel module loader 460 resides in a guest operating system on a virtual machine. In this embodiment, the centralized kernel module loader 460 detects the kernel module load event (462) to load a kernel module into the kernel of the guest operating system. When detected, the centralized kernel module loader 460 computes the hash of the kernel module (464), and performs an upcall to a user space application 470 (466). The user space application 470 generates the load event request with the hash (472) and sends the load event request with the hash to a hypervisor 480 (474). The hypervisor 480 sends the load event request to an access control server 490 (482). The access control server 490 processes the load event request 492, and sends a response to the hypervisor (494) with a decision of whether to allow or deny the load event. The hypervisor 480 sends the response to the requesting user space application 470 (484), and the user space application 470 sends the response to the requesting kernel module loader 460 (476). The kernel module loader 460 matches the response to the load event (468), and allows or denies the load event based on the response from the access control server 490 (469). It should be noted that the hypervisor 480 may receive load event requests from multiple virtual machines being monitored by the hypervisor 480, and the hypervisor 480 can track which virtual machine has requested permission to load the kernel module in order to send the response to the appropriate virtual machine.

In another embodiment, the kernel module loader 460 communicates with the hypervisor 480 using other mechanisms than the user space application 470. For example, the kernel module loader 460 may directly communicate the request to the hypervisor 480 as would be appreciated by one of ordinary skill in the art having the benefit of this disclosure.

Figure 5:
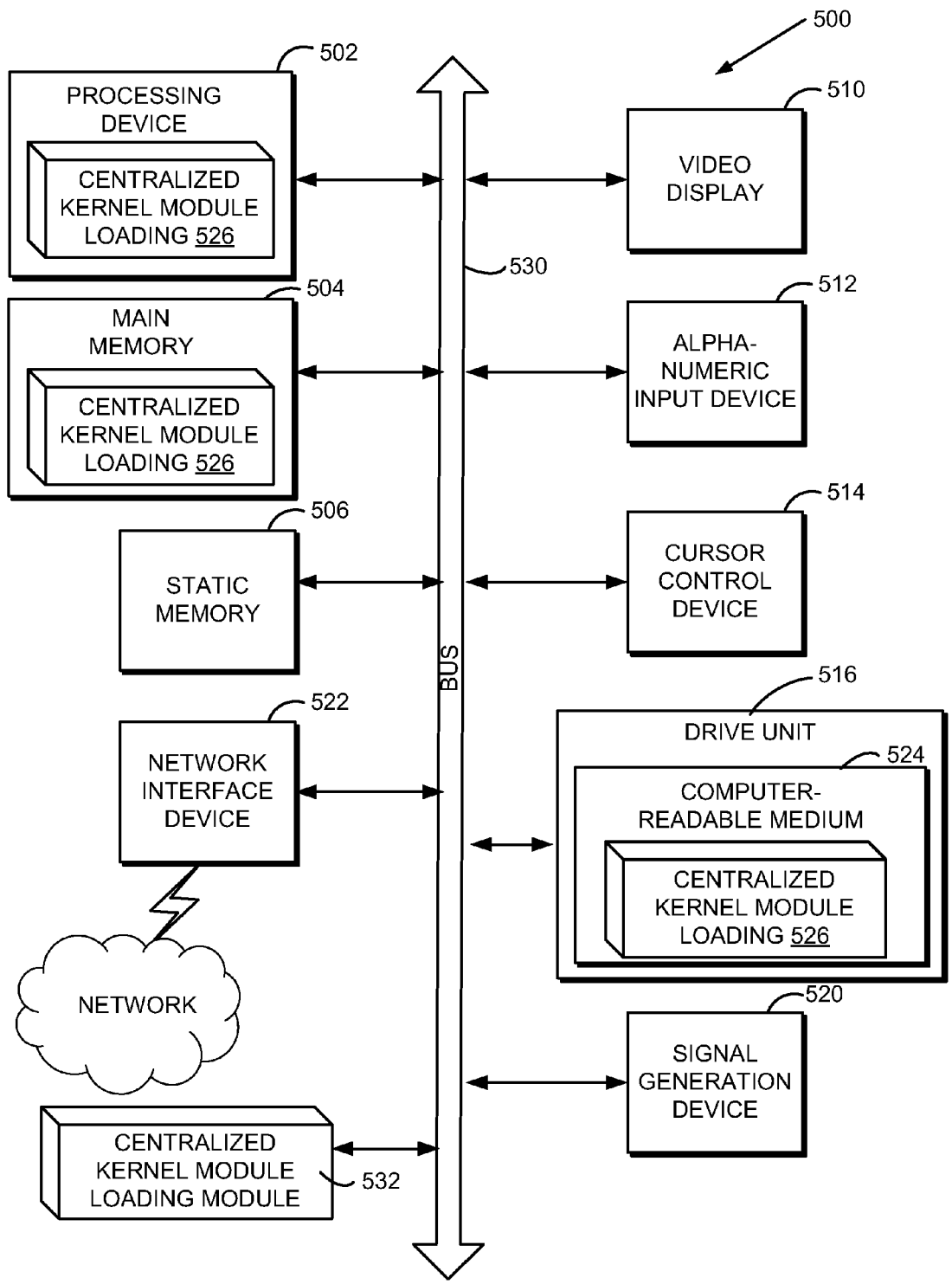
FIG. 5 illustrates a diagrammatic representation of a machine in the exemplary form of a computing system for centralized kernel module loading.

FIG. 5 illustrates a diagrammatic representation of a machine in the exemplary form of a computing system 500 for centralized kernel module loading. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for centralized kernel module loading, such as the methods 400 and 450 described above. In one embodiment, the computing system 500 represents various components that may be implemented in the client computing system 108 as described above. Alternatively, the client computing system 108 may include more or less components as illustrated in the computing system 500. In another embodiment, the computing system 500 represents various components that may be implemented in the server computing system 104.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., centralized kernel module loading 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., centralized kernel module loading 526) embodying any one or more of the methodologies or functions described herein. The centralized kernel module loading 526 may also reside, completely or at least partially, within the main memory 504 and/or within the processing device 502 during execution thereof by the computing system 500, the main memory 504 and the processing device 502 also constituting computer-readable storage media. The centralized kernel module loading 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The centralized kernel module loading module 532, components, and other features described herein (for example in relation to FIGS. 1-3) can be implemented as discrete hardware components or integrated in the functionality of hardware components such as ASICS, FPGAs, DSPs, or similar devices. The centralized kernel module loading module 532 may implement operations of centralized kernel module loading as described herein with respect to FIGS. 4A and 4B. In addition, the centralized kernel module loading module 532 can be implemented as firmware or functional circuitry within hardware devices. Further, the centralized kernel module loading module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    detecting, by a centralized kernel module loader executing by a client computing system, a kernel module load event to load a kernel module into a kernel of the client computing system;
    upon detection of the kernel module load event, computing a cryptographic hash of the kernel module;
    storing the computed cryptographic hash of the kernel module;
    sending the computed cryptographic hash over a client-server network to an access control server executing by a server computing system to verify whether the cryptographic hash is a permitted hash;
    receiving a response from the access control server to control loading of the kernel module for the kernel module load event, wherein the response indicates that the kernel module is a different version of a corresponding approved kernel module;

determining whether to deny the kernel module load event on the client computing system in view of the received response;

controlling the loading of the approved kernel module for the kernel module load event in view of on the received response; and removing the stored computed cryptographic hash of the kernel module in response to determining to deny the kernel module load event on the client computing system.

2. The method of claim 1, further comprising:
registering a second kernel module as an event listener for kernel module load events; and
monitoring for the kernel module load events by the second kernel module, wherein the second kernel modules computes the cryptographic hash.

3. The method of claim 1, further comprising executing a user space application in a user space of the client, wherein the user space application sends the cryptographic hash to the access control server.

4. The method of claim 3, wherein the user space application is an untrusted user space helper process.

5. The method of claim 1, wherein the access control server is to verify the cryptographic hash is a permitted hash by checking when the cryptographic hash is in a list of explicitly permitted or denied hashes.

6. The method of claim 1, wherein said receiving the response comprises receiving a message from the access control server, and wherein the message comprises:
the cryptographic hash;
a decision to permit or deny the kernel module load event on the client; and
a cryptographic signature of the cryptographic hash and the decision, wherein the access control server generates the cryptographic signature using a private key of the access control server.

7. The method of claim 6, wherein said permitting or denying the kernel module load event comprises checking the message for validity using a public key loaded into the kernel.

8. The method of claim 7, wherein said permitting or denying the kernel module load event further comprises matching the message to the kernel module load event that is outstanding.

9. The method of claim 8, wherein said matching comprises comparing the computed cryptographic hash against the cryptographic graphic received in the message.

10. The method of claim 1, wherein said sending the cryptographic hash comprises sending the cryptographic hash to the access control server via the client-server network.

11. The method of claim 1, wherein said sending the cryptographic hash comprises sending the cryptographic hash to the access control server via a hypervisor upcall to the access control server.

12. The method of claim 1, wherein said computing the cryptographic hash comprises:
copying contents of the kernel module into memory of the client;
calculating the cryptographic hash of the contents; and
storing the cryptographic hash in the memory.

13. The method of claim 12, further comprising:
linking the contents of the kernel module and executing the kernel module when the kernel module load event is permitted; and removing the contents of the kernel module from the memory when the kernel module load event is denied.

14. The method of claim 1, wherein the client is a virtual machine executed by the computing system.

15. The method of claim 1, wherein the client is the computing system.

16. A non-transitory computer readable storage medium including instructions that, when executed by a client computing system, cause the client computing system to perform operations comprising:
detecting, by a centralized kernel module loader executing by the client computing system, a kernel module load event to load a kernel module into a kernel of the client computing system;
upon detection of the kernel module load event, computing a cryptographic hash of the kernel module;
storing the computed cryptographic hash of the kernel module;
sending the computed cryptographic hash over a client-server network to an access control server executing by a server computing system to verify whether the cryptographic hash is a permitted hash;
receiving a response from the access control server to control loading of the kernel module for the kernel module load event, wherein the response indicates that the kernel module is a different version of a corresponding approved kernel module;
determining whether to deny the kernel module load event on the client computing system in view of the received response;
controlling the loading of the approved kernel module for the kernel module load event in view of on the received response; and
removing the stored computed cryptographic hash of the kernel module in response to determining to deny the kernel module load event on the client computing system.

17. The non-transitory computer readable storage medium of claim 16, wherein the operations further comprises:
registering a second kernel module as an event listener for kernel module load events; and
monitoring for the kernel module load events by the second kernel module, wherein the second kernel modules computes the cryptographic hash.

18. The non-transitory computer readable storage medium of claim 16, wherein the operations further comprises executing a user space application in a user space of the client, wherein the user space application sends the cryptographic hash to the access control server.

19. The non-transitory computer readable storage medium of claim 17, wherein said receiving the response comprises receiving a message from the access control server, and wherein the message comprises:
the cryptographic hash;
a decision to permit or deny the kernel module load event on the client; and
a cryptographic signature of the cryptographic hash and the decision, wherein the access control server generates the cryptographic signature using a private key of the access control server.

20. The non-transitory computer readable storage medium of claim 19, wherein said permitting or denying the kernel module load event comprises:
checking the message for validity using a public key loaded into the kernel; and
matching the message to the kernel module load event that is outstanding.

21. The non-transitory computer readable storage medium of claim 16, wherein said computing the cryptographic hash comprises:
copying contents of the kernel module into memory of the client;
calculating the cryptographic hash of the contents; and
storing the cryptographic hash in the memory.

22. The non-transitory computer readable storage medium of claim 16, wherein the client is a virtual computing system executed by the computing system.

23. A client computing system, comprising:
a data storage device; and
a processing device, coupled to the data storage device, to:
detect a kernel module load event to load a kernel module into a kernel of the client computing system;
compute a cryptographic hash of the kernel module upon detection of the kernel module load event;
store the computed cryptographic hash of the kernel module;
send the computed cryptographic hash over the client-server network to an access control server to an access control server executing by a server computing system to verify whether the cryptographic hash is a permitted hash;
receive a response from the access control server to control loading of the kernel module for the kernel module load event, wherein the response indicates that the kernel module is a different version of a corresponding approved kernel module;
determine whether to deny the kernel module load event on the client computing system in view of the received response;
control the loading of the approved kernel module for the kernel module load event in view of on the received response; and
remove the stored computed cryptographic hash of the kernel module in response to determining to deny the kernel module load event on the client computing system.

24. The computing system of claim 23, the processing device to execute a centralized kernel module loader to:
monitor for kernel module load events and to execute a user space application to send the cryptographic hash to the access control server;
permit or deny the kernel module load event in view of the response; and
check a validity of a message received as the response from the access control server using a public key of a key pair, wherein the message comprises a digital signature encrypted by the access control server using a private key of the key pair, and wherein the digital signature comprises the cryptographic hash and a decision to permit or deny the kernel module load event.

25. The method of claim 1, wherein the controlling the loading of the kernel module comprises:
permitting the loading of the kernel module for the kernel module load event in response to the response indicating that the cryptographic hash is verified as permitted; and
denying the loading of the kernel module for the kernel module load event in response to the response indicating that the cryptographic hash is not verified as permitted.

* * * * *